US012771265B2

(12) United States Patent
Yu et al.

(10) Patent No.: US 12,771,265 B2
(45) Date of Patent: Oct. 20, 2026

(54) MULTI-INVERTER PARALLEL SYSTEM AND METHOD FOR CONTROLLING GRID CONNECTION OF INVERTER

(71) Applicant: HUAWEI DIGITAL POWER TECHNOLOGIES CO., LTD., Shenzhen (CN)

(72) Inventors: Xinyu Yu, Shanghai (CN); Junjie Li, Shanghai (CN); Kai Xin, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 372 days.

(21) Appl. No.: 18/523,539

(22) Filed: Nov. 29, 2023

(65) Prior Publication Data

US 2024/0106351 A1 Mar. 28, 2024

Related U.S. Application Data

(63) Continuation of application No. PCT/CN2021/097533, filed on May 31, 2021.

(51) Int. Cl.
*H02M 7/5387* (2007.01)
*H02J 3/01* (2026.01)
(Continued)

(52) U.S. Cl.
CPC ..... *H02M 7/53871* (2013.01); *H02M 1/0067* (2021.05); *H02M 1/123* (2021.05);
(Continued)

(58) Field of Classification Search
CPC .... H02M 1/0067; H02M 1/123; H02M 7/493; H02M 7/53871; H02M 7/5395; H02J 3/01; H02J 3/38
See application file for complete search history.

(56) References Cited

U.S. PATENT DOCUMENTS

2009/0283129 A1* 11/2009 Foss .................... H02M 7/493
136/244
2016/0190811 A1 6/2016 Pan et al.
(Continued)

FOREIGN PATENT DOCUMENTS

| | | |
|---|---|---|
| CN | 110048588 B | 2/2021 |
| CN | 112510762 B | 5/2021 |
| CN | 112865177 A | 5/2021 |

OTHER PUBLICATIONS

Xia et al., "Modeling and Analysis of Circulating Currents Among Input-Parallel Output-Parallel Nonisolated Converters," IEEE Transactions on Power Electronics, Oct. 2018, 33(10):8412-8426.
(Continued)

*Primary Examiner* — Jue Zhang
(74) *Attorney, Agent, or Firm* — Fish & Richardson P.C.

(57) ABSTRACT

A multi-inverter parallel system are provided. The system includes a first inverter and a second inverter. The first inverter includes a first controller, a first inverter circuit, and a first relay. The second inverter includes a second controller, a second inverter circuit, and a second relay. Phases of an output end of the first inverter circuit are correspondingly connected to phases of an output end of the second inverter circuit. The first controller may control the first relay to be turned on. The second controller may control, when the second relay is turned off, a direct current bus voltage of the second inverter circuit to be the same as a direct current bus voltage of the first inverter circuit, and control a common-mode voltage injection manner of the second inverter circuit to be the same as a common-mode voltage injection manner of the first inverter circuit.

13 Claims, 11 Drawing Sheets

(51) Int. Cl.
*H02J 3/38* (2026.01)
*H02M 1/00* (2007.01)
*H02M 1/12* (2006.01)
*H02M 7/493* (2007.01)
*H02M 7/5395* (2006.01)

(52) U.S. Cl.
CPC ......... *H02M 7/493* (2013.01); *H02M 7/5395* (2013.01); *H02J 3/01* (2013.01); *H02J 3/38* (2013.01)

(56) References Cited

U.S. PATENT DOCUMENTS

| | | | | |
|---|---|---|---|---|
| 2016/0268923 | A1* | 9/2016 | Bremicker .............. | H02M 1/12 |
| 2017/0047742 | A1* | 2/2017 | Narla ......................... | H02J 3/00 |
| 2019/0229643 | A1* | 7/2019 | Bax .......................... | H02M 1/12 |
| 2020/0373830 | A1* | 11/2020 | Yu ............................. | H02J 3/40 |

OTHER PUBLICATIONS

Xing et al., "An Optimized Zero-Sequence Voltage Injection Method for Eliminating Circulating Current and Reducing Common Mode Voltage of Parallel-Connected Three-Level Converters," IEEE Transactions on Industrial Electronics, Aug. 2020, 67(8):6583-6596.
Extended European Search Report in European Appln. No. 25178950.9, mailed on Feb. 3, 2026, 8 pages.
Extended European Search Report in European AppIn No. 21943470.1, dated Jul. 4, 2024, 9 pages.
Purhonen, "Minimizing Circulating Current in Parallel-Connected Photovoltaic Inverters," Thesis for the degree of Doctor of Science (Technology), Lappeenranta University of Technology, Dec 2014, 105 pages.
Office Action in India Appln. No. 2023-37080557, mailed on May 15, 2026, 8 pages.

* cited by examiner

MULTI-INVERTER PARALLEL SYSTEM AND METHOD FOR CONTROLLING GRID CONNECTION OF INVERTER

CROSS-REFERENCE TO RELATED APPLICATIONS

This application is a continuation of International Application No. PCT/CN2021/097533, filed on May 31, 2021, the disclosure of which is hereby incorporated by reference in its entirety.

TECHNICAL FIELD

This application relates to the field of electronic technologies, and in particular, to a multi-inverter parallel system and a method for controlling grid connection of an inverter.

BACKGROUND

An inverter is a key apparatus for converting a direct current into an alternating current. To improve an inverter power capacity, a common implementation is to connect a plurality of inverters in series and parallel to form a multi-inverter parallel system, to transmit higher power.

For a single inverter, as shown in FIG. 1, a relay is usually designed on an alternating current side of the inverter, and grid connection and disconnection of the inverter can be implemented by controlling turning on and turning off of the relay. However, in a multi-inverter parallel system, regardless of a wire connection relationship between a plurality of inverters, due to a problem of a system communication delay, it is usually difficult for the plurality of inverters in the system to connect to a grid at the same time, but to connect to the grid in a specific time sequence because it is difficult to control a plurality of relays to be turned on at the same time. In this way, if an alternating-current three-phase voltage output by an inverter that is connected to the grid later (namely, a relay is turned on later) in the time sequence is different from an alternating-current three-phase voltage output by an inverter that is connected to the grid earlier (namely, a relay is turned on earlier) in the time sequence, a circulating current is formed on a circulation path, which causes a large grid connection current impulse and further affects system reliability.

SUMMARY

This application provides a multi-inverter parallel system and a method for controlling grid connection of an inverter, to avoid a problem that an impulse circulating current is generated at a moment when an inverter in the multi-inverter parallel system is connected to a grid, and improve system reliability.

According to a first aspect, an embodiment of this application provides a multi-inverter parallel system. The system includes a first inverter and a second inverter; the first inverter includes a first inverter circuit, a first controller, and a first relay, an input end of the first inverter circuit is configured to connect to a first direct current bus, and an output end of the first inverter circuit is configured to connect to the first relay; the second inverter includes a second inverter circuit, a second controller, and a second relay, an input end of the second inverter circuit is configured to connect to a second direct current bus, and an output end of the second inverter circuit is configured to connect to the second relay; phases of the output end of the first inverter circuit are correspondingly connected to phases of the output end of the second inverter circuit; the first controller is configured to control the first relay to be turned on; the second controller is configured to: when the second relay is turned off, control a direct current bus voltage of the second inverter circuit to be the same as a direct current bus voltage of the first inverter circuit existing when the first relay is turned on, and control a common-mode voltage injection manner of the second inverter circuit to be the same as a common-mode voltage injection manner of the first inverter circuit existing when the first relay is turned on; and then control the second relay to be turned on.

In the foregoing technical solution, before the second relay is turned on, the second controller may control the direct current bus voltage of the second inverter circuit to be consistent with the direct current bus voltage of the first inverter circuit (for example, both are a first voltage value or approach a first voltage value), and control the common-mode voltage injection manner of the second inverter circuit to be consistent with the common-mode voltage injection manner of the first inverter circuit (for example, both are a first common-mode voltage injection manner), so that common-mode voltages output by the first inverter circuit and the second inverter circuit are the same or similar. Then, the second relay is controlled to be turned on, to implement grid-connected operation of the second inverter, which may effectively avoid affecting system reliability caused by a large common-mode circulating current impulse generated at a moment when the second relay is turned on.

In a possible design of the first aspect, the first controller is further configured to: receive a first bus voltage instruction from the second controller, where the first bus voltage instruction indicates an initial direct current bus voltage of the second inverter circuit; determine a first voltage value based on an initial direct current bus voltage of the first inverter circuit and the initial direct current bus voltage of the second inverter circuit; and send a second bus voltage instruction to the second controller, where the second bus voltage instruction indicates the first voltage value.

In a possible design of the first aspect, the second controller is further configured to: receive a third bus voltage instruction from the first controller, where the third bus voltage instruction indicates an initial direct current bus voltage of the first inverter circuit; determine a first voltage value based on the initial direct current bus voltage of the first inverter circuit and an initial direct current bus voltage of the second inverter circuit; and send a fourth bus voltage instruction to the first controller, where the fourth bus voltage instruction indicates the first voltage value.

In the foregoing technical solution, the first controller and the second controller may negotiate to determine the first voltage value by exchanging information (for example, exchanging a bus voltage instruction), so as to control the direct current bus voltage of the second inverter circuit to be consistent with the direct current bus voltage of the first inverter circuit.

In a possible design of the first aspect, the second controller is further configured to: receive common-mode voltage injection manner information from the first controller, where the common-mode voltage injection manner information indicates a first common-mode voltage injection manner used by the first inverter circuit; and control, based on the first common-mode voltage injection manner, a common-mode voltage output by the second inverter circuit.

In the foregoing technical solution, the first controller may exchange information with the second controller, so as to notify the second controller of the common-mode voltage injection manner used by the first inverter circuit, so that the second controller controls the second inverter circuit to use the same common-mode voltage injection manner.

In a possible design of the first aspect, the second controller is further configured to: when the second relay is turned off, control an effective value of a differential-mode line voltage output by the second inverter circuit to be the same as an effective value of a grid line voltage.

In the foregoing technical solution, before the second relay is turned on, the second controller may control the differential-mode line voltage output by the second inverter circuit to be consistent with or close to the grid line voltage. Then, the second relay is controlled to be turned on, to implement grid-connected operation of the second inverter, which may effectively avoid affecting system reliability caused by a large differential-mode circulating current impulse generated at a moment when the second relay is turned on.

In a possible design of the first aspect, the first direct current bus includes a first positive direct current bus and a first negative direct current bus, the first positive direct current bus is configured to connect to a positive electrode of the input end of the first inverter circuit, and the first negative direct current bus is configured to connect to a negative electrode of the input end of the first inverter circuit; the second direct current bus includes a second positive direct current bus and a second negative direct current bus, the second positive direct current bus is configured to connect to a positive electrode of the input end of the second inverter circuit, and the second negative direct current bus is configured to connect to a negative electrode of the input end of the second inverter circuit; and the first negative direct current bus is connected to the second positive direct current bus, or the first positive direct current bus is connected to the second negative direct current bus.

The multi-inverter parallel system in the foregoing technical solution may be specifically a bipolar series-parallel multi-inverter parallel system.

According to a second aspect, an embodiment of this application provides another multi-inverter parallel system. The system includes a first inverter and a second inverter; the first inverter includes a first inverter circuit, a first controller, and a first relay, an input end of the first inverter circuit is configured to connect to a first direct current bus, and an output end of the first inverter circuit is configured to connect to the first relay; the second inverter includes a second inverter circuit, a second controller, and a second relay, an input end of the second inverter circuit is configured to connect to a second direct current bus, an output end of the second inverter circuit is configured to connect to the second relay, and phases of the output end of the first inverter circuit are correspondingly connected to phases of the output end of the second inverter circuit; the first direct current bus is connected to the second direct current bus; the first controller is configured to control the first relay to be turned on; and the second controller is configured to: when the second relay is turned off, control a common-mode voltage injection manner of the second inverter circuit to be the same as a common-mode voltage injection manner of the first inverter circuit existing when the first relay is turned on; and control the second relay to be turned on.

In the foregoing technical solution, because the first direct current bus and the second direct current bus are connected in parallel, a direct current bus voltage of the first inverter circuit is naturally consistent with a direct current bus voltage of the second inverter circuit. Therefore, before the second relay is turned on, the second controller may control the common-mode voltage injection manner of the second inverter circuit to be consistent with the common-mode voltage injection manner of the first inverter circuit (for example, both are a first common-mode voltage injection manner), so that the common-mode voltages output by the first inverter circuit and the second inverter circuit are the same or similar. Then, the second relay is controlled to be turned on, to implement grid-connected operation of the second inverter, which may effectively avoid affecting system reliability caused by a large common-mode circulating current impulse generated at a moment when the second relay is turned on.

In a possible design of the second aspect, the second controller is further configured to: receive common-mode voltage injection manner information from the first controller, where the common-mode voltage injection manner information indicates a first common-mode voltage injection manner used by the first inverter circuit; and control, based on the first common-mode voltage injection manner, a common-mode voltage output by the second inverter circuit.

In a possible design of the second aspect, the second controller is further configured to: when the second relay is turned off, control an effective value of a differential-mode line voltage output by the second inverter circuit to be the same as an effective value of a grid line voltage.

In the foregoing technical solution, before the second relay is turned on, the second controller may control the differential-mode line voltage output by the second inverter circuit to be set to be consistent with or close to the grid line voltage. Then, the second relay is controlled to be turned on, to implement grid-connected operation of the second inverter, which may effectively avoid affecting system reliability caused by a large differential-mode circulating current impulse generated at a moment when the second relay is turned on.

In a possible design of the second aspect, the first direct current bus includes a first positive direct current bus and a first negative direct current bus, the first positive direct current bus is configured to connect to a positive electrode of the input end of the first inverter circuit, and the first negative direct current bus is configured to connect to a negative electrode of the input end of the first inverter circuit; the second direct current bus includes a second positive direct current bus and a second negative direct current bus, the second positive direct current bus is configured to connect to a positive electrode of the input end of the second inverter circuit, and the second negative direct current bus is configured to connect to a negative electrode of the input end of the second inverter circuit; and the first positive direct current bus is connected to the second positive direct current bus, and the first negative direct current bus is connected to the second negative direct current bus.

The multi-inverter parallel system in the foregoing technical solution may be specifically a multi-inverter parallel system with a common direct current bus.

According to a third aspect, an embodiment of this application provides a method for controlling grid connection of an inverter in a multi-inverter parallel system. The method is applied to a second controller of a second inverter in a multi-inverter parallel system, the second inverter is an inverter that is to be grid-connected and that is in the multi-inverter parallel system, the second inverter includes the second controller, a second inverter circuit, and a second relay, an input end of the second inverter circuit is connected to a second direct current bus, and an output end of the second inverter circuit is connected to the second relay; and the method includes: The second controller determines a first inverter, where the first inverter is an inverter that is grid-connected and that is in the multi-inverter parallel system, the first inverter includes a first controller, a first inverter circuit, and a first relay, an input end of the first inverter circuit is connected to a first direct current bus, an output end of the first inverter circuit is connected to the first relay, the first relay is turned on, and phases of the output end of the first inverter circuit are correspondingly connected to phases of the output end of the second inverter circuit; when the second relay is turned off, the second controller controls a direct current bus voltage of the second inverter circuit to be the same as a direct current bus voltage of the first inverter circuit, and controls a common-mode voltage injection manner of the second inverter circuit to be the same as a common-mode voltage injection manner of the first inverter circuit; and the second controller controls the second relay to be turned on.

In a possible design of the third aspect, that the second controller controls, when the second relay is turned off, a direct current bus voltage of the second inverter circuit to be the same as a direct current bus voltage of the first inverter circuit includes: The second controller controls, when the second relay is turned off, a difference between the direct current bus voltage of the second inverter circuit and a first voltage value to be less than a first voltage threshold.

In a possible design of the third aspect, the method further includes: The second controller determines the first voltage value based on an initial direct current bus voltage of the first inverter circuit and an initial direct current bus voltage of the second inverter circuit; or the second controller receives a second bus voltage instruction from the first controller, where the second bus voltage instruction indicates the first voltage value.

In a possible design of the third aspect, that the second controller controls, when the second relay is turned off, a common-mode voltage injection manner of the second inverter circuit to be the same as a common-mode voltage injection manner of the first inverter circuit includes: The second controller receives common-mode voltage injection manner information from the first controller, where the common-mode voltage injection manner information indicates a first common-mode voltage injection manner used by the first inverter circuit; and the second controller controls, based on the first common-mode voltage injection manner, a common-mode voltage output by the second inverter circuit.

In a possible design of the third aspect, the method further includes: The second controller controls, when the second relay is turned off, an effective value of a differential-mode line voltage output by the second inverter circuit to be the same as an effective value of a grid line voltage.

In a possible design of the third aspect, the second direct current bus includes a second positive direct current bus and a second negative direct current bus, the second positive direct current bus is connected to a positive electrode of the input end of the second inverter circuit, and the second negative direct current bus is connected to a negative electrode of the input end of the second inverter circuit; the first direct current bus includes a first positive direct current bus and a first negative direct current bus, the first positive direct current bus is connected to a positive electrode of the input end of the first inverter circuit, and the first negative direct current bus is connected to a negative electrode of the input end of the first inverter circuit; and the first negative direct current bus is connected to the second positive direct current bus, or the first positive direct current bus is connected to the second negative direct current bus.

For beneficial effects in any one of the third aspect or the possible designs of the third aspect, refer to corresponding descriptions in the first aspect. Details are not described again.

According to a fourth aspect, an embodiment of this application provides a method for controlling grid connection of an inverter in a multi-inverter parallel system. The method is applied to a second controller of a second inverter, the second inverter is an inverter that is to be grid-connected and that is in the multi-inverter parallel system, the second inverter includes the second controller, a second inverter circuit, and a second relay, an input end of the second inverter circuit is connected to a second direct current bus, and an output end of the second inverter circuit is connected to the second relay; and the method includes: The second controller determines a first inverter, where the first inverter is an inverter that is grid-connected and that is in the multi-inverter parallel system, the first inverter includes a first controller, a first inverter circuit, and a first relay, an input end of the first inverter circuit is connected to a first direct current bus, an output end of the first inverter circuit is connected to the first relay, the first relay is turned on, the first direct current bus is connected to the second direct current bus, and phases of the output end of the first inverter circuit are correspondingly connected to phases of the output end of the second inverter circuit; when the second relay is turned off, the second controller controls a common-mode voltage injection manner of the second inverter circuit to be the same as a common-mode voltage injection manner of the first inverter circuit; and the second controller controls the second relay to be turned on.

In a possible design of the fourth aspect, that the second controller controls, when the second relay is turned off, a common-mode voltage injection manner of the second inverter circuit to be the same as a common-mode voltage injection manner of the first inverter circuit includes: The second controller receives common-mode voltage injection manner information from the first controller, where the common-mode voltage injection manner information indicates a first common-mode voltage injection manner used by the first inverter circuit; and the second controller controls, based on the first common-mode voltage injection manner, a common-mode voltage output by the second inverter circuit.

In a possible design of the fourth aspect, the method further includes: The second controller controls, when the second relay is turned off, an effective value of a differential-mode line voltage output by the second inverter circuit to be the same as an effective value of a grid line voltage.

In a possible design of the fourth aspect, the second direct current bus includes a second positive direct current bus and a second negative direct current bus, the second positive direct current bus is connected to a positive electrode of the input end of the second inverter circuit, and the second negative direct current bus is connected to a negative electrode of the input end of the second inverter circuit; the first direct current bus includes a first positive direct current bus and a first negative direct current bus, the first positive direct current bus is connected to a positive electrode of the input end of the first inverter circuit, and the first negative direct current bus is connected to a negative electrode of the input end of the first inverter circuit; and the first positive direct current bus is connected to the second positive direct current bus, and the first negative direct current bus is connected to the second negative direct current bus.

For beneficial effects in any one of the fourth aspect or the possible designs of the fourth aspect, refer to corresponding descriptions in the second aspect. Details are not described again.

DESCRIPTION OF EMBODIMENTS

To make the objectives, technical solutions, and advantages of this application clearer, the following further describes this application in detail with reference to the accompanying drawings.

It should be noted that, in the description of this application, "at least one" means one or more, and "a plurality of" means two or more. In view of this, in embodiments of this application, "a plurality of" may also be understood as "at least two". The term "and/or" describes an association relationship for describing associated objects and represents that three relationships may exist. For example, A and/or B may represent the following three cases: Only A exists, both A and B exist, and only B exists. In addition, the character "/" generally indicates an "or" relationship between the associated objects. In addition, it should be understood that in description of this application, terms such as "first" and "second" are merely used for distinguishing and description, but should not be understood as indicating or implying relative importance, or should not be understood as indicating or implying a sequence.

Figure 1:
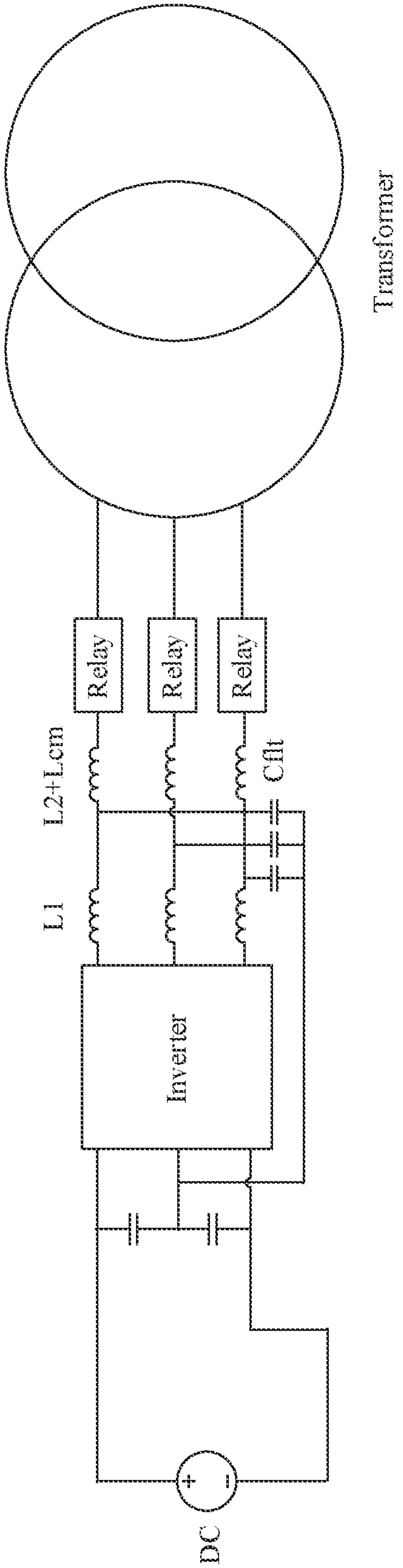
FIG. 1 is a schematic diagram of relays connected to a single inverter according to an embodiment of this application.
Figure 2:
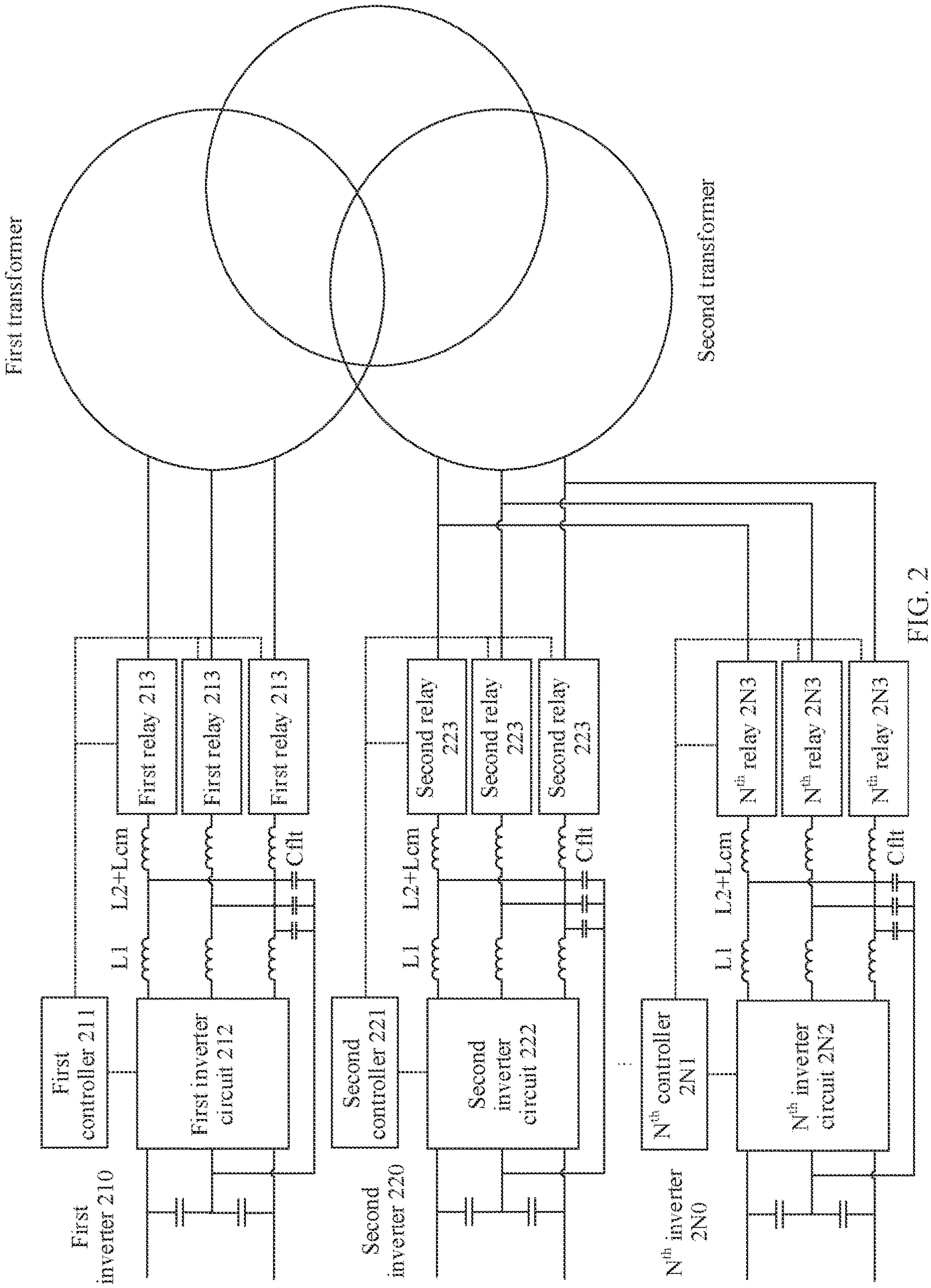
FIG. 2 is a schematic diagram of a structure of a multi-inverter parallel system according to an embodiment of this application.

An embodiment of this application provides a multi-inverter parallel system. As shown in FIG. 2, the system includes a first inverter 210 and a second inverter 220.

It should be noted that a quantity of inverters included in the multi-inverter parallel system is not specifically limited in this application. In this application, only an example in which the first inverter is an inverter that is grid-connected and that is in the multi-inverter parallel system, and the second inverter is an inverter that is not grid-connected but is to be grid-connected and that is in the multi-inverter parallel system is used to describe a grid connection mechanism (or referred to as a startup mechanism) in the multi-inverter parallel system provided in this embodiment of this application. The first inverter may be an inverter that is first grid-connected and that is in the multi-inverter parallel system, may be an inverter that is recently grid-connected and that is in the multi-inverter parallel system, or may be any inverter that has been grid-connected and that is in the multi-inverter parallel system. This is not limited in this application.

Optionally, the system may include more inverters. For example, as shown in FIG. 2, the system includes N inverters in total, and the N inverters include a first inverter 210, a second inverter 220, . . . , and an $N^{th}$ transformer 2N0, where N is an integer greater than or equal to 2.

Specifically, the first inverter 210 includes a first controller 211, a first inverter circuit 212, and a first relay 213. The first controller 211 is configured to control the first inverter circuit 212 and the first relay 213. An input end (also referred to as a direct current outlet end) of the first inverter circuit 212 is connected to a first direct current bus, the first direct current bus includes a first positive direct current bus and a first negative direct current bus, and optionally, further includes a first medium direct current bus, and the first positive direct current bus is connected to a positive electrode of the input end of the first inverter circuit 212, and the first negative direct current bus is connected to a negative electrode of the input end of the first inverter circuit 212. Each output end (also referred to as an alternating current outlet end) of the first inverter circuit 212 is connected to one end of the first relay 213, the other end of the first relay 213 is connected to a first transformer, and an output of the first transformer may be further connected to an alternating current grid. In this way, grid connection and disconnection of the first inverter 210 can be implemented by controlling turning on and turning off of the first relay 213.

Similarly, the second inverter 220 includes a second controller 221, a second inverter circuit 222, and a second relay 223. The second controller 221 is configured to control the second inverter circuit 222 and the second relay 223. An input end (also referred to as a direct current outlet end) of the second inverter circuit 222 is connected to a second direct current bus, the second direct current bus includes a second positive direct current bus and a second negative direct current bus, and optionally, further includes a second medium direct current bus, and the second positive direct current bus is connected to a positive electrode of the input end of the second inverter circuit 222, and the second negative direct current bus is connected to a negative electrode of the input end of the second inverter circuit 222. Each output end (also referred to as an alternating current outlet end) of the second inverter circuit 222 is connected to one end of a second relay 223, the other end of the second relay 223 is connected to a second transformer, and an output of the second transformer is further connected to an alternating current grid. In this way, grid connection and disconnection of the second inverter 220 can be implemented by controlling turning on and turning off of the second relay 223.

Phases of the output end of the first inverter circuit 212 are correspondingly connected to phases of the output end of the second inverter circuit 222, to form a form in which a plurality of inverters are connected in parallel. The input end of the first inverter circuit 212 and the input end of the second inverter circuit 222 may be connected in a plurality of possible manners. For example, in a bipolar series-parallel multi-inverter parallel system, if the second inverter 220 corresponds to the first inverter 210, a negative electrode of the input end of the first inverter circuit 212 is connected to a positive electrode of the input end of the second inverter circuit 222 (that is, the first negative direct current bus is connected to the second positive direct current bus). Alternatively, a positive electrode of the input end of the first inverter circuit 212 may be connected to a negative electrode of the input end of the second inverter circuit 222 (that is, the first positive direct current bus is connected to the second negative direct current bus). For another example, in a multi-inverter parallel system with a common negative electrode direct current bus, a negative electrode of the input end of the first inverter circuit 212 may be connected to a negative electrode of the input end of the second inverter circuit 222 (that is, the first negative direct current bus is connected to the second negative direct current bus). For another example, in a multi-inverter parallel system with a common positive electrode direct current bus, a positive electrode of the input end of the first inverter circuit 212 may be connected to a positive electrode of the input end of the second inverter circuit 222 (that is, the first positive direct current bus is connected to the second positive direct current bus).

It should be noted that the first transformer and the second transformer may be a same transformer or a same winding of a same transformer, or may be different transformers or different windings of a same transformer. This is not limited in this application.

There is a control connection between the first inverter circuit 212 and the first relay 213, and the first controller 211 (as shown by dashed lines in FIG. 2). Based on the control connection between the first controller 211 and the first inverter circuit 212, the first controller 211 may provide a voltage control instruction to the first inverter circuit 212, to control a direct current bus voltage of the first inverter circuit 212 or control an alternating current voltage output by the first inverter circuit 212. Based on the control connection between the first controller 211 and the first relay 213, the first controller 211 may provide a high-level or low-level control signal to the first relay 213, to control the first relay 213 to be turned on or turned off.

For example, as shown in FIG. 2, the first inverter 210 is a three-phase inverter. The first inverter circuit 212 has three-phase alternating current outlet ends, each phase alternating current outlet end is connected to the first transformer by using one first relay 213, and there are three first relays 213 in total. The first controller 211 may synchronously control the three first relays 213. To be specific, when the first controller 211 controls the first relay 213 to be turned on, it indicates that the first controller 211 controls the three first relays 213 to be turned on together; or when the first controller 211 controls the first relay 213 to be turned off, it indicates that the first controller 211 controls the three first relays 213 to be turned off together. For example, the first controller 211 may set a potential connected to the three first relays 213 to a high level, to provide a high-level control signal to the three first relays 213 at the same time, so as to control the three first relays 213 to be turned on. For another example, the first controller 211 may alternatively set a potential connected to the three first relays 213 to a low level, to provide a low-level control signal to the three first relays 213 at the same time, so as to control the three first relays 213 to be turned off.

There is a control connection between the second inverter circuit 222 and the second relay 223, and the second controller 221 (as shown by dashed lines in FIG. 2). Based on the control connection between the second controller 221 and the second inverter circuit 222, the second controller 221 may provide a voltage control instruction for the second inverter circuit 222, to control a direct current bus voltage of the second inverter circuit 222 or an alternating current voltage output by the second inverter circuit 222. Based on the control connection between the second controller 221 and the second relay 223, the second controller 221 may provide a high-level signal or a low-level control signal to the second relay 223, to control the second relay 223 to be turned on or turned off.

For example, as shown in FIG. 2, the second inverter 220 is a three-phase inverter. The second inverter circuit 222 has three-phase alternating current outlet ends, each phase alternating current outlet end is connected to the second transformer by using one second relay 223, and there are three second relays 223 in total. The second controller 221 may synchronously control the three second relays 223. To be specific, when the second controller 221 controls the second relay 223 to be turned on, it indicates that the second controller 221 controls the three second relays 223 to be turned on together; and when the second controller 221 controls the second relay 223 to be turned off, it indicates that the second controller 221 controls the three second relays 223 to be turned off together. For example, the second controller 221 may set a potential connected to the three second relays 223 to a high level, to provide a high-level control signal for the three second relays 223 at the same time, so as to control the three second relays 223 to be turned on. For another example, the second controller 221 may alternatively set a potential connected to the three second relays 223 to a low level, to provide a low-level control signal for the three second relays 223 at the same time, so as to control the three second relays 223 to be turned off.

There is a communication connection between the first controller 211 and the second controller 221 (the communication connection is not shown in FIG. 2). The first controller 211 and the second controller 221 may exchange necessary instructions or information by using the communication connection, to support the inverter in grid connection or disconnection. The communication connection may be a wired connection (for example, a wired cable), or may be a wireless connection (for example, a 5th generation (5th generation, 5G) network). This is not limited in this application.

Specifically, the first controller may be configured to control the first relay to be turned on. Optionally, when the first relay is turned on, the first controller may control a direct current bus voltage of the first inverter circuit to be a first voltage value (or control a difference between a direct current bus voltage of the first inverter circuit and a first voltage value to be less than a first voltage threshold), and control a common-mode voltage injection manner of the first inverter circuit to be a first common-mode voltage injection manner. Optionally, the first controller may be further configured to send common-mode voltage injection manner information to the second controller, where the common-mode voltage injection manner information indicates a first common-mode voltage injection manner used by the first inverter circuit. The first controller may further control, based on the first common-mode voltage injection manner, a common-mode voltage output by the first inverter circuit.

The first common-mode voltage injection manner may be a continuous pulse width modulation (CPWM) manner or a discontinuous pulse width modulation (discontinuous pulse width modulation, DPWM) manner, which is not limited in this application. Both the CPWM manner and the DPWM manner may have a plurality of possible specific implementations, and details are not described in this application. The "common-mode voltage injection manner" is a specific preset rule of instructing to add a common-mode voltage component to a three-phase voltage output by a three-phase inverter, and may also be referred to as a modulation manner or a common-mode voltage modulation manner, or has another name. This is not limited in this application.

The second controller is configured to: when the second relay is turned off, control a direct current bus voltage of the second inverter circuit to be the same as a direct current bus voltage of the first inverter circuit existing when the first relay is turned on, and control a common-mode voltage injection manner of the second inverter circuit to be the same as a common-mode voltage injection manner of the first inverter circuit existing when the first relay is turned on; and then control the second relay to be turned on.

Optionally, when the second relay is turned on, the second controller may control a direct current bus voltage of the second inverter circuit to be a first voltage value (or control a difference between a direct current bus voltage of the second inverter circuit and a first voltage value to be less than a first voltage threshold), control a common-mode voltage injection manner of the second inverter circuit to be a first common-mode voltage injection manner, and then control the second relay to be turned on. The first common-mode voltage injection manner is the common-mode voltage injection manner used by the first inverter circuit above. The second controller may receive the common-mode voltage injection manner information from the first controller, determine the first common-mode voltage injection manner based on the common-mode voltage injection manner information, and then control, based on the first common-mode voltage injection manner, a common-mode voltage output by the second inverter circuit. Optionally, before controlling the second relay to be turned on, the second controller may control, based on the first common-mode voltage injection manner, a common-mode voltage output by the second inverter circuit.

In this embodiment of this application, that the first controller controls a difference between a direct current bus voltage of the first inverter circuit and a first voltage value to be less than a first voltage threshold may be understood as follows: The first controller controls the direct current bus voltage of the first inverter circuit to be equal to or close to the first voltage value. Similarly, that the second controller controls a difference between a direct current bus voltage of the second inverter circuit and a first voltage value to be less than a first voltage threshold may be understood as follows: The second controller controls the direct current bus voltage of the second inverter circuit to be equal to or close to the first voltage value.

In this way, in the foregoing manner, before the second relay is turned on, the second controller may control the direct current bus voltage of the second inverter circuit to be consistent with the direct current bus voltage of the first inverter circuit (for example, both are a first voltage value or approach a first voltage value), and control the common-mode voltage injection manner of the second inverter circuit to be consistent with the common-mode voltage injection manner of the first inverter circuit (for example, both are a first common-mode voltage injection manner), so that common-mode voltages output by the first inverter circuit and the second inverter circuit are the same or similar. Then, the second relay is controlled to be turned on, to implement grid-connected operation of the second inverter, which may effectively avoid affecting system reliability caused by a large common-mode circulating current impulse generated at a moment when the second relay is turned on.

Optionally, the first voltage value is greater than or equal to an initial direct current bus voltage of the first inverter circuit, and is greater than or equal to an initial direct current bus voltage of the second inverter circuit. The initial direct current bus voltage of the first inverter circuit is a direct current bus voltage of the first inverter circuit existing before the second relay is turned on. Similarly, the initial direct current bus voltage of the second inverter circuit is a direct current bus voltage of the second inverter circuit existing before the second relay is turned on.

For example, the first controller and the second controller may negotiate and determine the first voltage value by exchanging information (for example, exchanging a bus voltage instruction), so that the first inverter and the second inverter agree on the first voltage value. In other words, the first voltage value may be the initial direct current bus voltage of the first inverter circuit, or may be the initial direct current bus voltage of the second inverter circuit, or may be another value different from the initial direct current bus voltage of the first inverter circuit and the initial direct current bus voltage of the second inverter circuit.

Figure 3A:
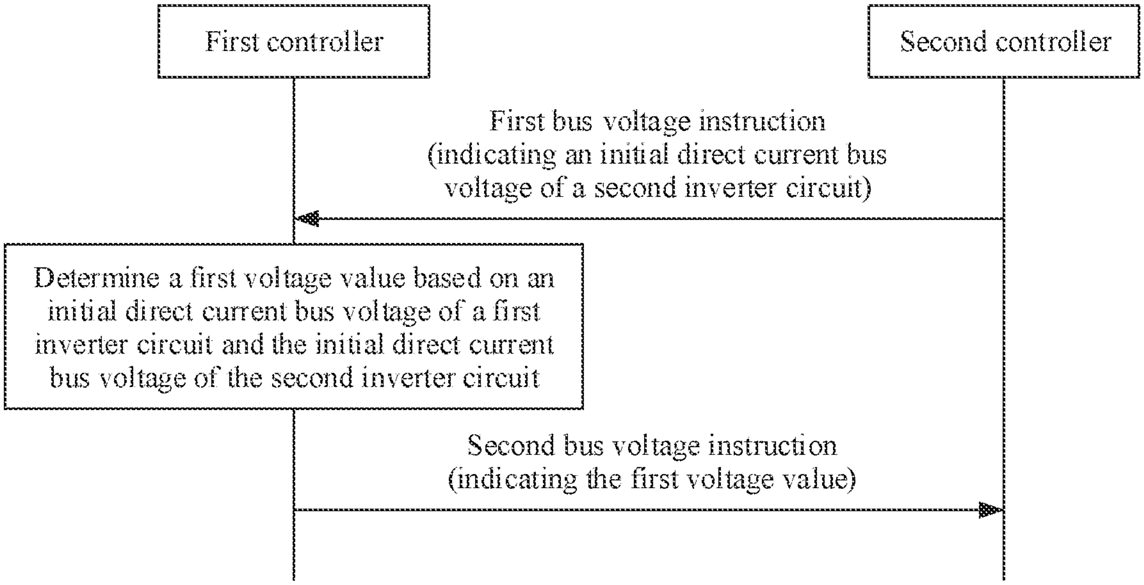
FIG. 3*a*, FIG. 3*b*, and FIG. 3*c* are schematic diagrams of several manners in which a first controller and a second controller exchange a bus voltage instruction to determine a first voltage value according to an embodiment of this application.

In an example, as shown in FIG. 3*a*, the first controller may receive a first bus voltage instruction from the second controller. The first bus voltage instruction indicates the initial direct current bus voltage of the second inverter circuit. In this way, the first controller may determine the first voltage value based on the initial direct current bus voltage of the first inverter circuit and the initial direct current bus voltage of the second inverter circuit that is determined based on the first bus voltage instruction, and then send a second bus voltage instruction to the second controller. The second bus voltage instruction indicates the first voltage value. For example, the first controller may determine a larger voltage value of the initial direct current bus voltage of the first inverter circuit and the initial direct current bus voltage of the second inverter circuit as the first voltage value, or may determine a voltage value that is greater than the initial direct current bus voltage of the first inverter circuit and greater than the initial direct current bus voltage of the second inverter circuit as the first voltage value. This is not limited in this application.

Figure 3B:
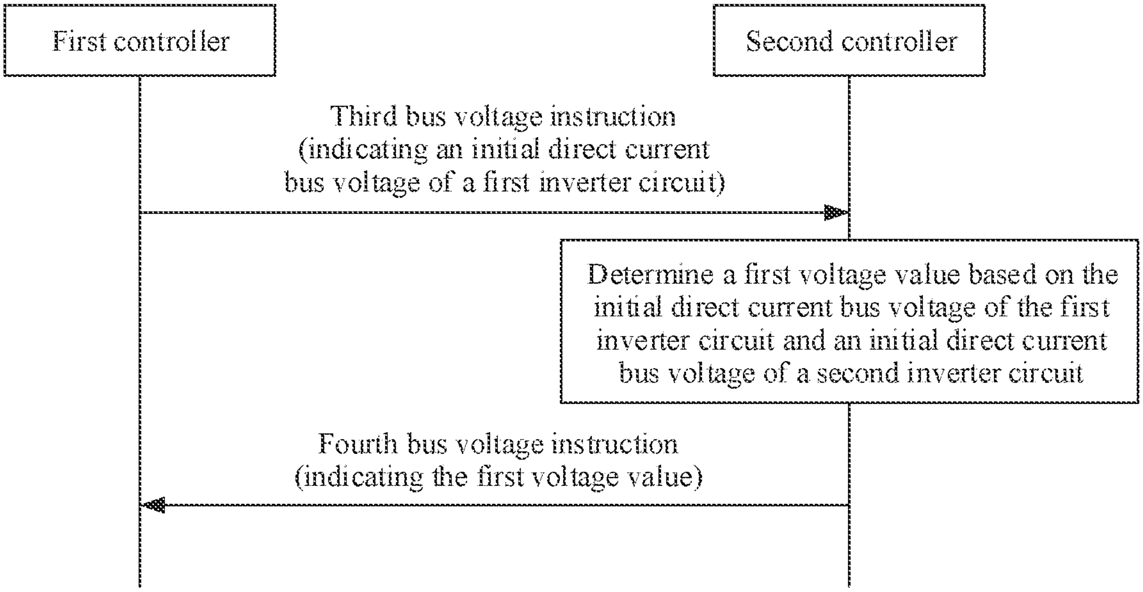

In another example, as shown in FIG. 3*b*, the second controller may receive a third bus voltage instruction from the first controller. The third bus voltage instruction indicates the initial direct current bus voltage of the first inverter circuit. In this way, the second controller may determine the first voltage value based on the initial direct current bus voltage of the second inverter circuit and the initial direct current bus voltage of the first inverter circuit that is determined based on the third bus voltage instruction, and then send a fourth bus voltage instruction to the first controller. The fourth bus voltage instruction indicates the first voltage value. For example, the second controller may determine a larger voltage value of the initial direct current bus voltage of the first inverter circuit and the initial direct current bus voltage of the second inverter circuit as the first voltage value, or may determine a voltage value that is greater than the initial direct current bus voltage of the first inverter circuit and greater than the initial direct current bus voltage of the second inverter circuit as the first voltage value. This is not limited in this application.

Figure 3C:
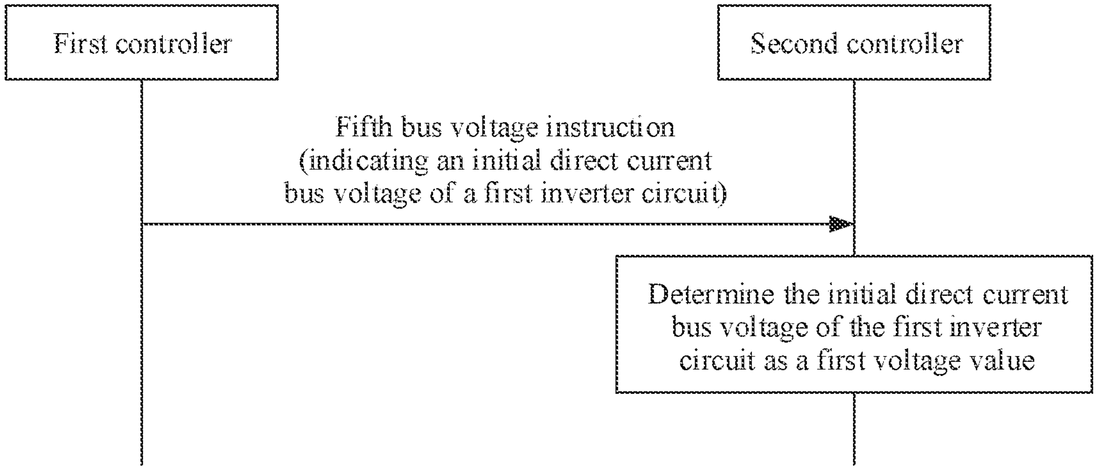

In another example, if a direct current bus voltage of an inverter circuit of a grid-connected inverter is greater than a direct current bus voltage of an inverter circuit that is not grid-connected by default, in this case, as shown in FIG. 3*c*, the first controller may send a fifth bus voltage instruction to the second controller, and indicate the initial direct current bus voltage of the first inverter circuit to the second controller by using the fifth bus voltage instruction. In this way, after receiving the fifth bus voltage instruction, the second controller may determine the initial direct current bus voltage of the first inverter circuit as the first voltage value. As described above, the second controller may control the second relay to be turned on after controlling the direct current bus voltage of the second inverter circuit to be equal to or close to the first voltage value, to control the second relay to be turned on.

Optionally, when the second relay is turned off, the second controller may alternatively control an effective value of a differential-mode line voltage output by the second inverter circuit to be the same as an effective value of a grid line voltage (or control a difference between an effective value of a differential-mode line voltage output by the second inverter circuit and an effective value of a grid line voltage to be less than a second voltage threshold), and then control the second relay to be turned on. To be specific, the second controller may control the second relay to be turned on after controlling the direct current bus voltage of the second inverter circuit to be the same as the direct current bus voltage of the first inverter circuit existing when the first relay is turned on, controlling the effective value of the differential-mode line voltage output by the second inverter circuit to be the same as the effective value of the grid line voltage, and controlling the common-mode voltage injection manner of the second inverter circuit to be the same as the common-mode voltage injection manner of the first inverter circuit existing when the first relay is turned on.

In this way, in the foregoing manner, before the second relay is turned on, the second controller may control the differential-mode line voltage output by the second inverter circuit to be set to be consistent with or close to the grid line voltage. Then, the second relay is controlled to be turned on, to implement grid-connected operation of the second inverter, which may effectively avoid affecting system reliability caused by a large differential-mode circulating current impulse generated at a moment when the second relay is turned on.

The following provides several specific examples of a multi-inverter parallel system provided in embodiments of this application. The grid connection mechanism of an inverter described above is applicable to the following specific multi-inverter parallel systems.

Figure 4A:
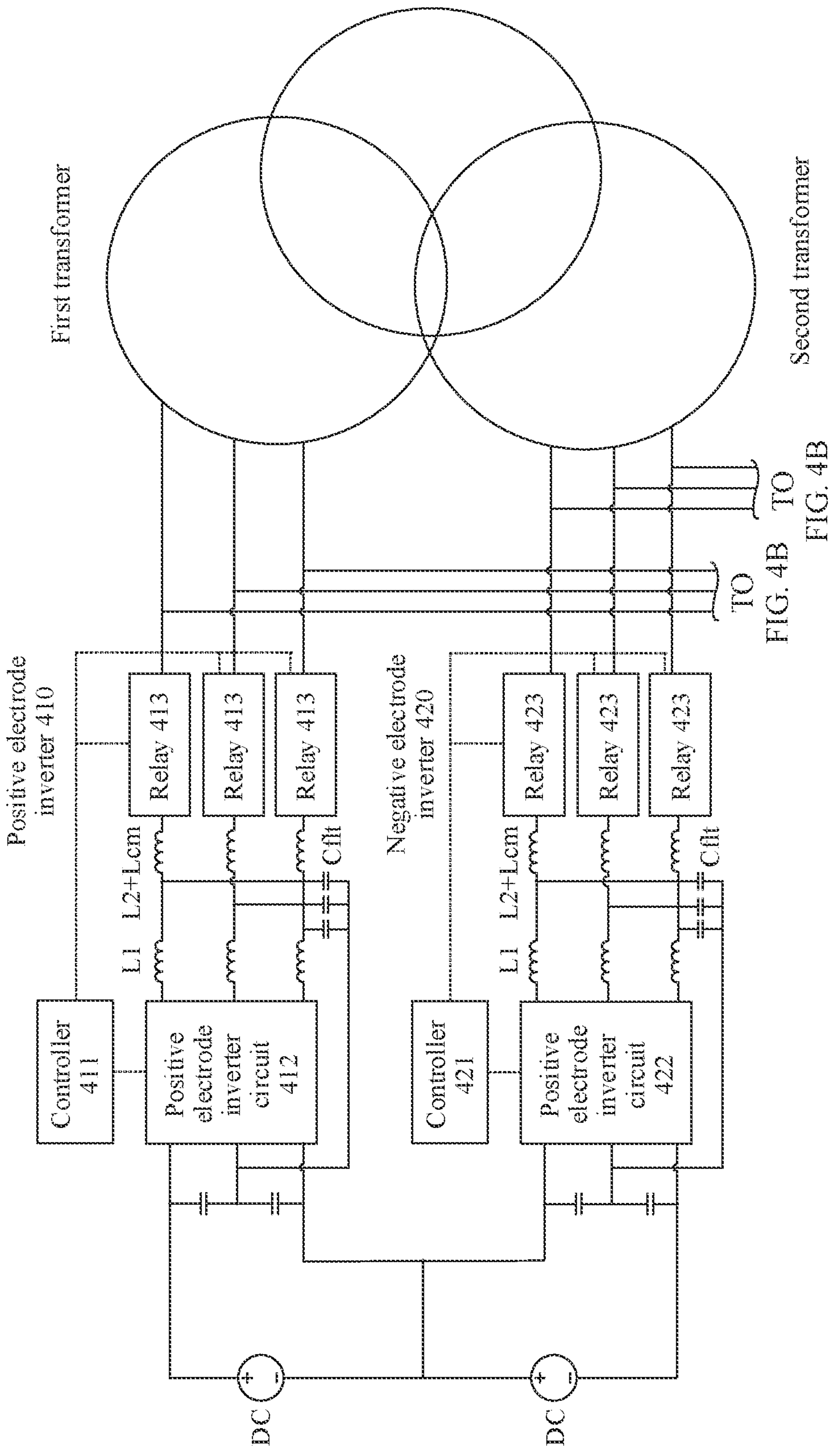
FIG. 4A and FIG. 4B are a schematic diagram of a bipolar series-parallel multi-inverter parallel system according to an embodiment of this application.
Figure 4B:
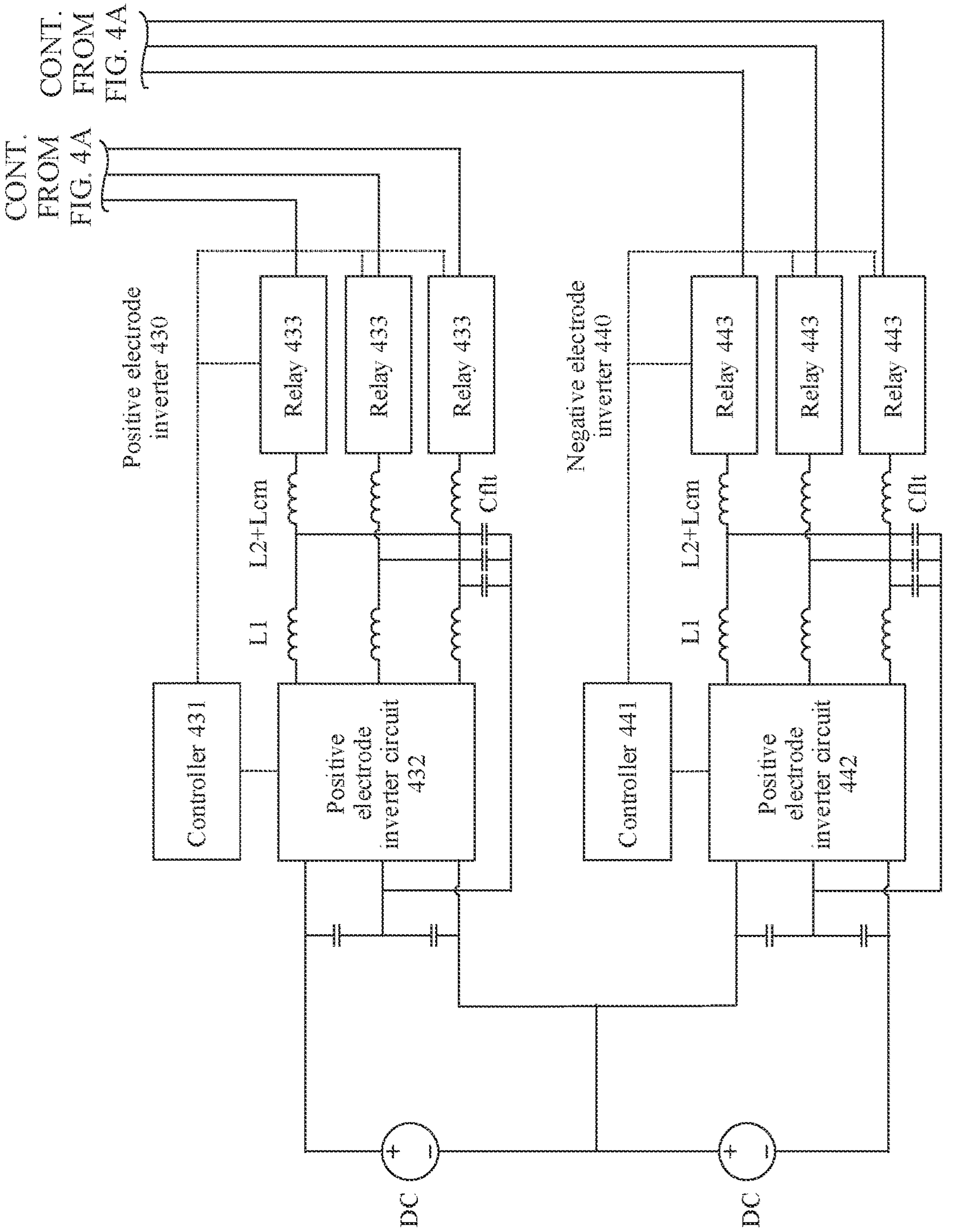

FIG. 4A and FIG. 4B show a bipolar series-parallel multi-inverter parallel system. The system includes 2M inverters, where M is a positive integer. 2M inverters can be divided into two groups. Each group includes M inverters. One of the two groups of inverters has a one-to-one correspondence to the other one of the two groups of inverters. A negative electrode of an input end of an inverter circuit of an $i^{th}$ inverter in a first group is connected to a positive electrode of an input end of an inverter circuit of an $i^{th}$ inverter in a second group. Phases of output ends of the inverter circuits in the first group of inverters are connected to each other, phases of output ends of the inverter circuits in the second group of inverters are also connected to each other, and the output end of the inverter circuit in the first group of inverters and the output end of the inverter circuit in the second group of inverters are separately connected to a different transformer or a different winding of a same transformer, and are further connected to a three-phase alternating current grid. Because negative potentials of input ends of the inverter circuits of the first group of inverters are higher than negative potentials of input ends of the inverter circuits of the second group of inverters, the first group of inverters may be referred to as positive electrode inverters, and the second group of inverters may be referred to as negative electrode inverters.

For ease of illustration, FIG. 4A and FIG. 4B show only four inverters (that is, two inverters in each group). Each inverter is a three-phase inverter, and may include a controller, an inverter circuit, a relay, and related circuit elements such as a capacitor and an inductor. As shown in FIG. 4A and FIG. 4B, a positive electrode inverter 410 includes a controller 411, a positive electrode inverter circuit 412, and three relays 413, a negative electrode inverter 420 includes a controller 421, a negative electrode inverter circuit 422, and three relays 423, a positive electrode inverter 430 includes a controller 431, a positive electrode inverter circuit 432, and three relays 433, and a negative electrode inverter 440 includes a controller 441, a negative electrode inverter circuit 442, and three relays 443. The positive electrode inverter 410 and the positive electrode inverter 430 belong to the first group of inverters, and the negative electrode inverter 420 and the negative electrode inverter 440 belong to the second group of inverters. It may be understood that a quantity of inverters in each group may be extended based on an actual requirement and in the foregoing connection manner, and details are not described again.

Figure 5:
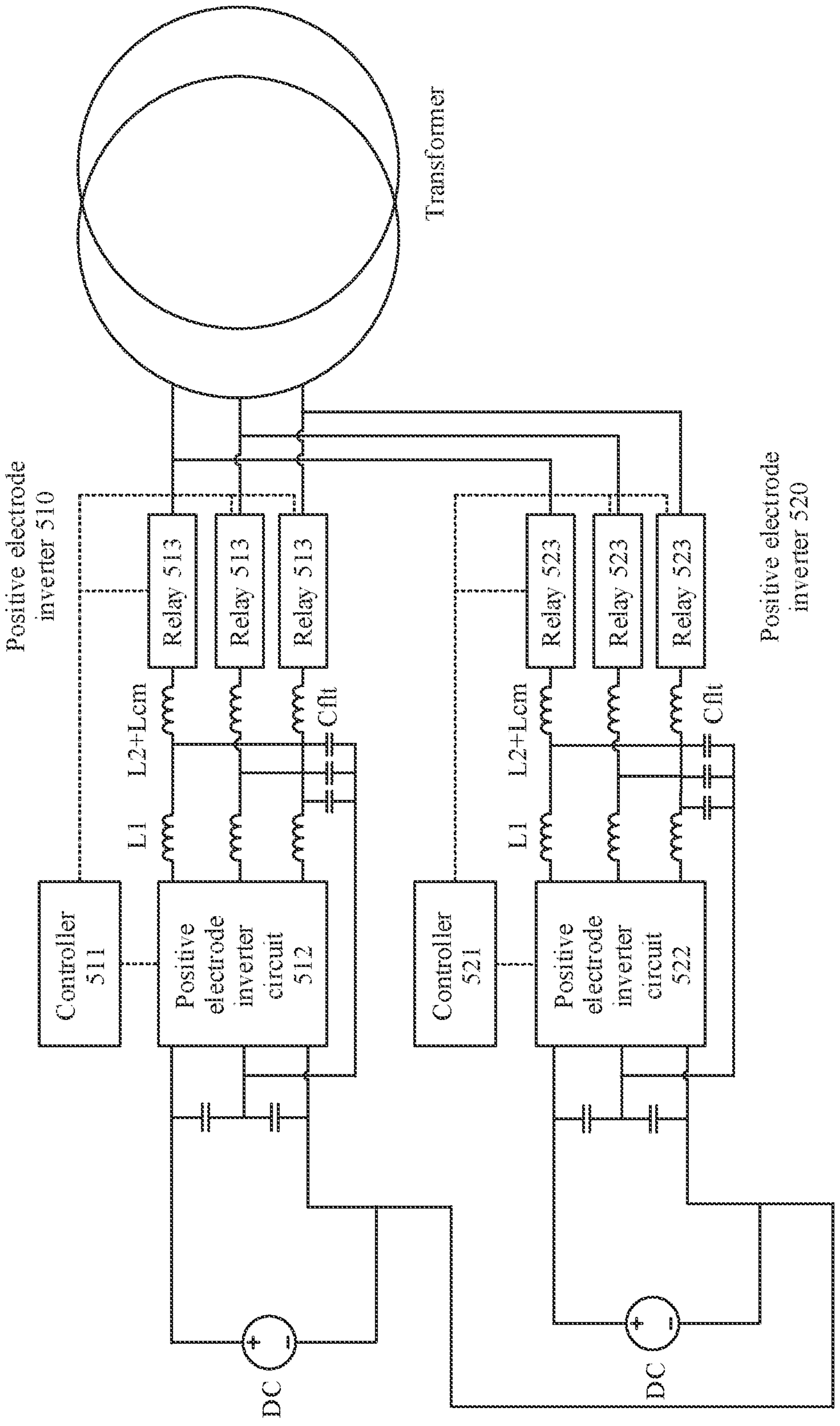
FIG. 5 is a schematic diagram of a multi-inverter parallel system with a common direct current negative electrode according to an embodiment of this application.

A grid connection mechanism of an inverter applicable to the bipolar series-parallel multi-inverter parallel system in FIG. 5 may include:

Initially, no inverter in the system is grid-connected, and an inverter (for example, the positive electrode inverter 410) may be specified to be first grid-connected. Before the positive electrode inverter 410 is grid-connected, there is no grid-connected inverter in the system. Therefore, when the three relays 413 of the positive electrode inverter 410 are turned on, it only needs to be ensured that a bus voltage of the positive electrode inverter 410 is not lower than a minimum bus voltage required for grid connection, and any common-mode voltage injection manner may be used. Before the relay 413 is turned on, the positive electrode inverter 410 may further control a differential-mode line voltage output by the positive electrode inverter 410 to be consistent with a grid line voltage. Then, the positive electrode inverter 410 controls the three relays 413 to be turned on, to implement grid-connected operation of the positive electrode inverter 410.

After the positive electrode inverter 410 is grid-connected, when an inverter subsequently needs to be grid-connected, for example, when the negative electrode inverter 420 needs to be grid-connected, the negative electrode inverter 420 may control, by communicating with the positive electrode inverter 410 (for example, exchanging a bus voltage instruction), a direct current bus voltage of the to-be-grid-connected negative electrode inverter 420 to be consistent with a direct current bus voltage of the grid-connected positive electrode inverter 410, and control a common-mode voltage injection manner of the to-be-grid-connected negative electrode inverter 420 to be consistent with a common-mode voltage injection manner of the grid-connected positive electrode inverter 410. Before the three relays 423 are turned on, the to-be-grid-connected negative electrode inverter 420 may further control a differential-mode line voltage output by the negative electrode inverter 420 to be consistent with the grid line voltage, and control a common-mode voltage output by the negative electrode inverter 420 based on a common-mode voltage injection manner the same as the common-mode voltage injection manner of the positive electrode inverter 410. Subsequently, the negative electrode inverter 420 controls the three relays 423 to be turned on, to implement grid-connected operation of the negative electrode inverter 420.

Further, grid-connected operation of another inverter is implemented in the foregoing manner. For example, after the positive electrode inverter 410 and the negative electrode inverter 430 are grid-connected, when the positive electrode inverter 430 needs to be grid-connected, the positive electrode inverter 430 may control, by communicating with the positive electrode inverter 410 (for example, exchanging a bus voltage instruction), a direct current bus voltage of the to-be-grid-connected positive electrode inverter 430 to be consistent with a direct current bus voltage of the grid-connected positive electrode inverter 410, and control a common-mode voltage injection manner of the to-be-grid-connected positive electrode inverter 430 to be consistent with the common-mode voltage injection manner of the grid-connected negative electrode inverter 420. Before the three relays 433 are turned on, the to-be-grid-connected positive electrode inverter 430 may control a differential-mode line voltage output by the positive electrode inverter 430 to be consistent with the grid line voltage, and control, based on a common-mode voltage injection manner the same as the common-mode voltage injection manner of the positive electrode inverter 410, a common-mode voltage output by the positive electrode inverter 430. Subsequently, the positive electrode inverter 430 controls the three relays 433 to be turned on, to implement grid-connected operation of the positive electrode inverter 430. Alternatively, the positive electrode inverter 430 may alternatively control, by communicating with the negative electrode inverter 420 (for example, exchanging a bus voltage instruction), a direct current bus voltage of the to-be-grid-connected positive electrode inverter 430 to be consistent with the direct current bus voltage of the grid-connected negative electrode inverter 420, and control a common-mode voltage injection manner of the to-be-grid-connected positive electrode inverter 430 to be consistent with the common-mode voltage injection manner of the grid-connected negative electrode inverter 420. Before the three relays 433 are turned on, the to-be-grid-connected positive electrode inverter 430 may control a differential-mode line voltage output by the positive electrode inverter 430 to be consistent with the grid line voltage, and control, based on a common-mode voltage injection manner the same as the common-mode voltage injection manner of the negative electrode inverter 420, a common-mode voltage output by the positive electrode inverter 430. Subsequently, the positive electrode inverter 430 controls the three relays 433 to be turned on, to implement grid-connected operation of the positive electrode inverter 430.

Based on the foregoing grid connection mechanism, common-mode voltage soft start and differential-mode voltage soft start can be implemented when an inverter is grid-connected, to avoid a large common-mode circulating current and a large differential-mode circulating current generated in a system at a moment when the inverter is grid-connected, and effectively improve system reliability.

A sequence in which a plurality of inverters in the multi-inverter parallel system are grid-connected is not specifically limited in this application. It may be understood that, if the positive electrode inverter 410 is first grid-connected, and then the negative electrode inverter 420 is grid-connected, when the positive electrode inverter 410 is grid-connected, and the negative electrode inverter 420 needs to be grid-connected, the positive electrode inverter 410 may be used as the first inverter described above, and the negative electrode inverter 420 may be used as the second inverter described above to perform the grid connection mechanism of an inverter described above. Similarly, if the negative electrode inverter 420 is first grid-connected, and then the positive electrode inverter 410 is grid-connected, when the negative electrode inverter 420 is grid-connected, and the positive electrode inverter 410 needs to be grid-connected, the negative electrode inverter 420 may be used as the first inverter described above, and the positive electrode inverter 410 may be used as the second inverter described above to perform the grid connection mechanism of an inverter described above.

FIG. 5 shows a multi-inverter parallel system with a common negative electrode direct current bus, which may also be referred to as a multi-inverter parallel system with a common direct current bus negative electrode. The system may include a plurality of inverters, negative electrodes of input ends of inverter circuits of the plurality of inverters are connected to each other, and phases of output ends of the inverter circuits of the plurality of inverters are connected to each other. Because potentials of these inverters to a direct current side parallel point are all positive, these inverters may be referred to as positive electrode inverters. For ease of illustration, FIG. 5 shows only two inverters. Each inverter is a three-phase inverter, and may include a controller, an inverter circuit, a relay, and related circuit elements such as a capacitor and an inductor. As shown in FIG. 5, a positive electrode inverter 510 includes a controller 511, a positive electrode inverter circuit 512, and three relays 513, and a positive electrode inverter 520 includes a controller 521, a positive electrode inverter circuit 522, and three relays 523. However, it should be noted that a quantity of inverters included in the system is not specifically limited in this application. For example, the system may further include another positive electrode inverter. For a grid connection mechanism of an inverter in the system, refer to corresponding descriptions in FIG. 4A and FIG. 4B. Details are not described again.

Figure 6:
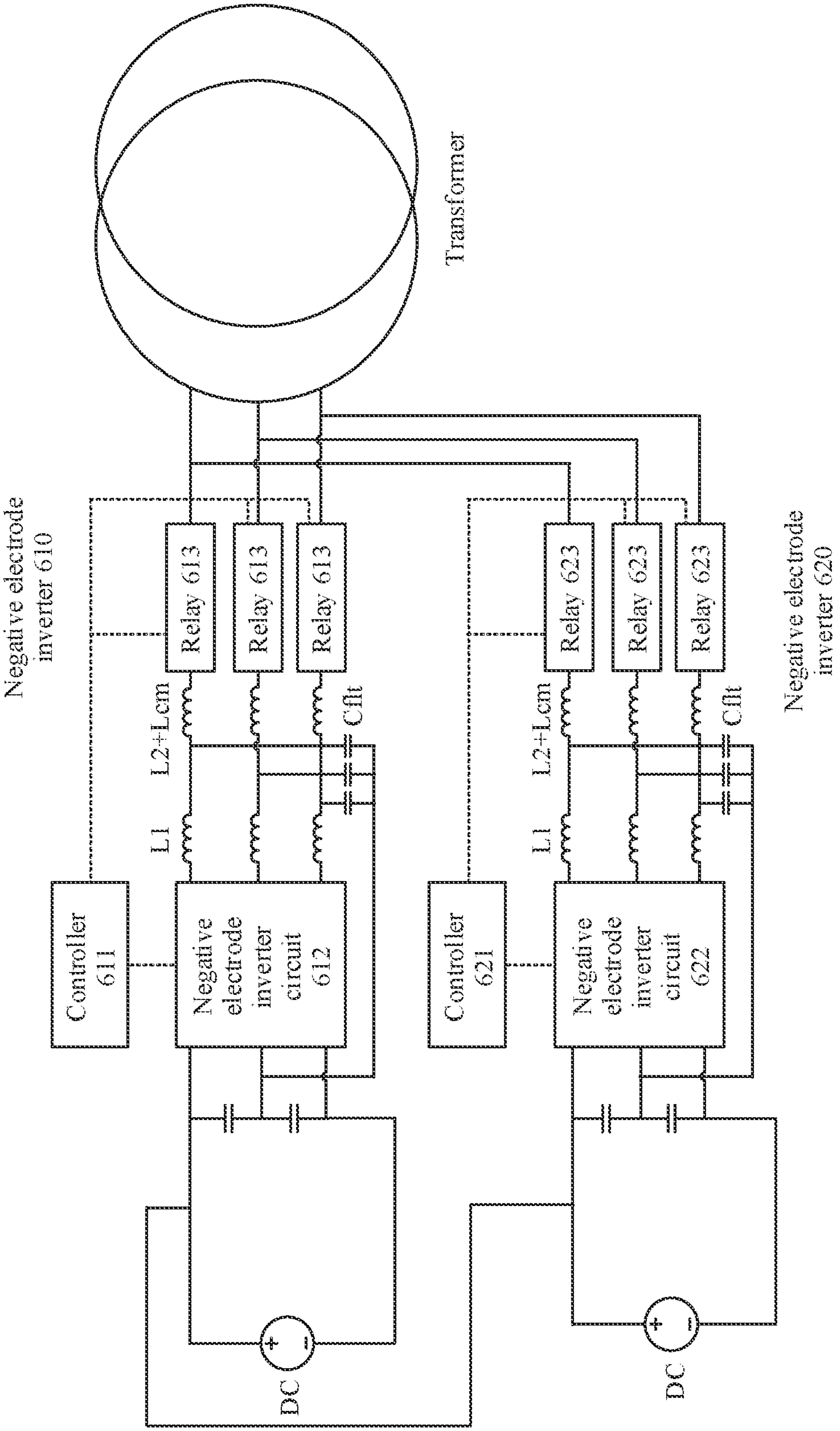
FIG. 6 is a schematic diagram of a multi-inverter parallel system with a common direct current positive electrode according to an embodiment of this application.

FIG. 6 shows a multi-inverter parallel system with a common positive electrode direct current bus, which may also be referred to as a multi-inverter parallel system with a common direct current bus positive electrode. The system may include a plurality of inverters, positive electrodes of input ends of inverter circuits of the plurality of inverters are connected to each other, and phases of output ends of the inverter circuits of the plurality of inverters are connected to each other. Because potentials of these inverters to a direct current side parallel point are all negative, these inverters may be referred to as negative electrode inverters. For ease of illustration, FIG. 6 shows only two inverters. Each inverter is a three-phase inverter, and may include a controller, an inverter circuit, a relay, and related circuit elements such as a capacitor and an inductor. As shown in FIG. 6, a negative electrode inverter 610 includes a controller 611, a negative electrode inverter circuit 612, and three relays 613, and a negative electrode inverter 620 includes a controller 621, a negative electrode inverter circuit 622, and three relays 623. However, it should be noted that a quantity of inverters included in the system is not specifically limited in this application. For example, the system may further include another negative electrode inverter. For a grid connection mechanism of an inverter in the system, refer to corresponding descriptions in FIG. 4A and FIG. 4B. Details are not described again.

Figure 7:
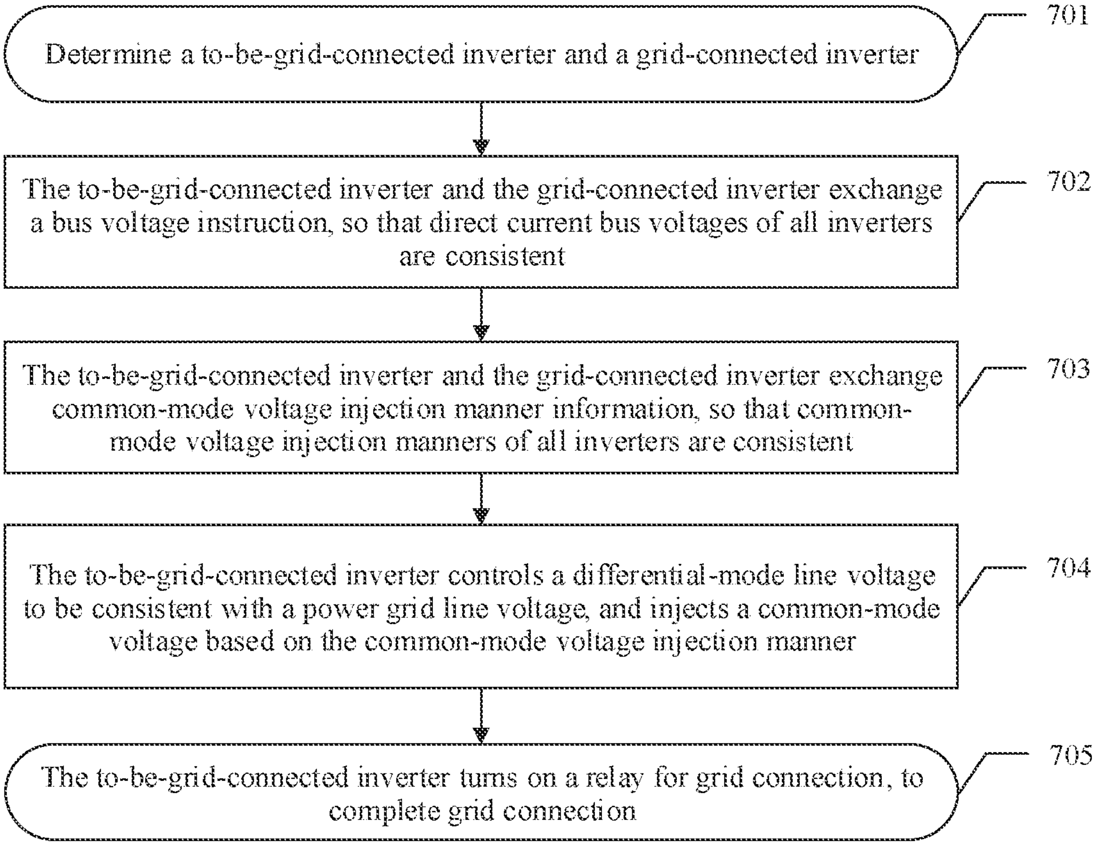
FIG. 7 is a schematic flowchart of a method for controlling grid connection of an inverter according to an embodiment of this application.

Based on the foregoing possible multi-inverter parallel system, an embodiment of this application further provides a method for controlling grid connection of an inverter. As shown in FIG. 7, the method includes the following steps.

Step 701: Determine a to-be-grid-connected inverter and a grid-connected inverter.

Step 702: The to-be-grid-connected inverter and the grid-connected inverter exchange a bus voltage instruction, so that direct current bus voltages of all inverters are consistent, that is, the to-be-grid-connected inverter controls a direct current bus voltage of the to-be-grid-connected inverter to be a first voltage value (or controls a difference between a direct current bus voltage of the to-be-grid-connected inverter and a first voltage value to be less than a first voltage threshold), and the grid-connected inverter also controls a direct current bus voltage of the grid-connected inverter to be a first voltage value (or controls a difference between a direct current bus voltage of the grid-connected inverter and a first voltage value to be less than a first voltage threshold).

Step 703: The to-be-grid-connected inverter and the grid-connected inverter exchange common-mode voltage injection manner information, so that all inverters use a same common-mode voltage injection manner.

It should be noted that an execution sequence of step 702 and step 703 is not specifically limited in this application.

Step 704: Before a relay is turned on, the to-be-grid-connected inverter controls a differential-mode line voltage of the to-be-grid-connected inverter to be consistent with a grid line voltage, that is, the to-be-grid-connected inverter controls an effective value of the differential-mode line voltage output by the to-be-grid-connected inverter to be the same as an effective value of the grid line voltage (or controls a difference between an effective value of the differential-mode line voltage output by the to-be-grid-connected inverter and an effective value of the grid line voltage to be less than a second voltage threshold), and injects a common-mode voltage based on the foregoing common-mode voltage injection manner.

Step 705: The to-be-grid-connected inverter turns on the relay for grid connection to implement startup.

Figure 8:
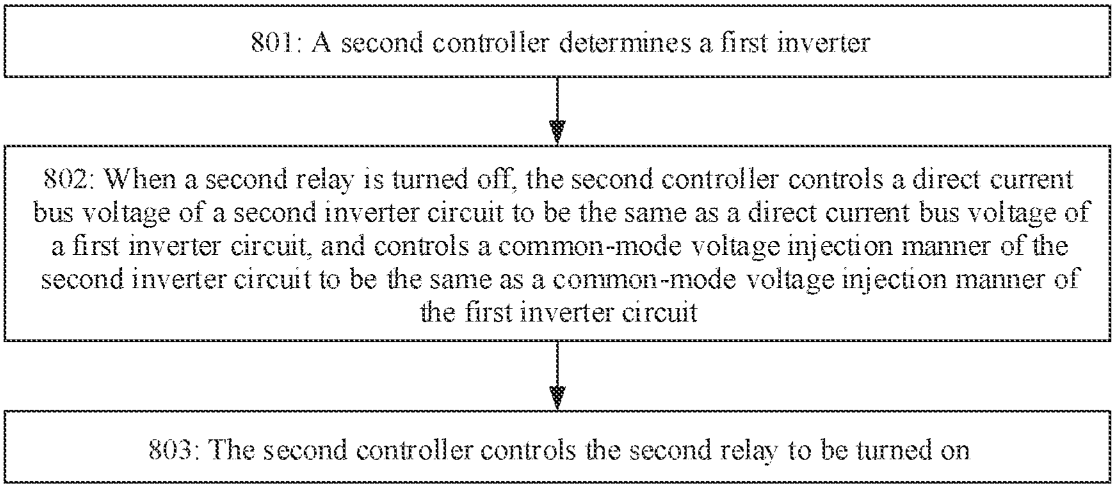
FIG. 8 is another schematic flowchart of a method for controlling grid connection of an inverter according to an embodiment of this application.

From a perspective of the second inverter, a method for controlling grid connection of an inverter corresponding to the foregoing multi-inverter parallel system provided in this embodiment of this application may be shown in FIG. 8. The method is applied to a second controller of a second inverter in the multi-inverter parallel system, and the second inverter is an inverter that is to be grid-connected and that is in the multi-inverter parallel system. The method includes the following steps.

Step 801: The second controller determines a first inverter, where the first inverter is an inverter that is grid-connected and that is in the multi-inverter parallel system.

In this embodiment of this application, the second controller may select, based on a specific preset rule, an inverter that is grid-connected and that is in the multi-inverter parallel system as the first inverter. For example, the second controller may select an inverter that is first grid-connected and that is in the multi-inverter parallel system as the first inverter, or may select an inverter that is recently grid-connected and that is in the multi-inverter parallel system as the first inverter, or may select any inverter that has been grid-connected in the multi-inverter parallel system as the first inverter. This is not limited in this application.

Step 802: When the second relay is turned off, the second controller controls a direct current bus voltage of the second inverter circuit to be the same as a direct current bus voltage of the first inverter circuit, and controls a common-mode voltage injection manner of the second inverter circuit to be the same as a common-mode voltage injection manner of the first inverter circuit.

Optionally, when the second relay is turned off, the second controller may alternatively control an effective value of a differential-mode line voltage output by the second inverter circuit to be the same as an effective value of a grid line voltage.

Step 803: The second controller controls the second relay to be turned on.

An embodiment of this application further provides another multi-inverter parallel system. The multi-inverter parallel system includes a first inverter and a second inverter. The first inverter includes a first controller, a first inverter circuit, and a first relay. The first controller is configured to control the first inverter circuit and the first relay. The second inverter includes a second controller, a second inverter circuit, and a second relay. The second controller is configured to control the second inverter circuit and the second relay.

Specifically, an input end (also referred to as a direct current outlet end) of the first inverter circuit is connected to a first direct current bus, the first direct current bus includes a first positive direct current bus and a first negative direct current bus, and optionally, further includes a first medium direct current bus, and the first positive direct current bus is connected to a positive electrode of the input end of the first inverter circuit, and the first negative direct current bus is connected to a negative electrode of the input end of the first inverter circuit. An output end (also referred to as an alternating current outlet end) of the first inverter circuit is connected to one end of the first relay, the other end of the first relay is connected to a transformer, and an output of the transformer may be further connected to an alternating current grid. In this way, grid connection and disconnection of the first inverter can be implemented by controlling turning on and turning off of the first relay.

An input end (also referred to as a direct current outlet end) of the second inverter circuit is connected to a second direct current bus, the second direct current bus includes a second positive direct current bus and a second negative direct current bus, and optionally, further includes a second medium direct current bus, and the second positive direct current bus is connected to a positive electrode of the input end of the second inverter circuit, and the second negative direct current bus is connected to a negative electrode of the input end of the second inverter circuit. An output end (also referred to as an alternating current outlet end) of the second inverter circuit is connected to one end of the second relay, the other end of the second relay is connected to a same transformer, and the transformer is further connected to the alternating current grid. In this way, grid connection and disconnection of the second inverter can be implemented by controlling turning on and turning off of the second relay.

Phases of the output end of the first inverter circuit are correspondingly connected to phases of the output end of the second inverter circuit, and the first direct current bus of the first inverter circuit is connected to the second direct current bus of the second inverter circuit. Specifically, the positive electrode of the input end of the first inverter circuit is connected to the positive electrode of the input end of the second inverter circuit (that is, the first positive direct current bus is connected to the second positive direct current bus), and the negative electrode of the input end of the first inverter circuit is connected to the negative electrode of the input end of the second inverter circuit (that is, the first negative direct current bus is connected to the second negative direct current bus).

In the multi-inverter parallel system, because the first direct current bus of the first inverter circuit is connected to the second direct current bus of the second inverter circuit, a direct current bus voltage of the first inverter circuit is naturally consistent with a direct current bus voltage of the second inverter circuit. Therefore, in a grid connection process of the second inverter, the first controller may be configured to control the first relay to be turned on. Optionally, the first controller may be configured to: control a common-mode voltage injection manner of the first inverter circuit to be a first common-mode voltage injection manner, and send common-mode voltage injection manner information to the second controller without controlling the direct current bus voltage of the first inverter circuit. The common-mode voltage injection manner information indicates the first common-mode voltage injection manner used by the first inverter circuit. Optionally, the first controller may further control, based on the first common-mode voltage injection manner, a common-mode voltage output by the first inverter circuit.

Correspondingly, the second controller may be configured to: when the second relay is turned off, control a common-mode voltage injection manner of the second inverter circuit to be the same as a common-mode voltage injection manner of the first inverter circuit existing when the first relay is turned on; and then control the second relay to be turned on. Optionally, the second controller may be configured to: receive the common-mode voltage injection manner information from the first controller, control, based on the common-mode voltage injection manner information, a common-mode voltage injection manner of the second inverter circuit to be the first common-mode voltage injection manner, and then control the second relay to be turned on without controlling the direct current bus voltage of the second inverter circuit.

Optionally, the second controller may further control, based on the first common-mode voltage injection manner, a common-mode voltage output by the second inverter circuit.

Optionally, when the second relay is turned off, the second controller may alternatively control an effective value of a differential-mode line voltage output by the second inverter circuit to be the same as an effective value of a grid line voltage (or control a difference between an effective value of a differential-mode line voltage output by the second inverter circuit and an effective value of a grid line voltage to be less than a second voltage threshold), and then control the second relay to be turned on.

Figure 9:
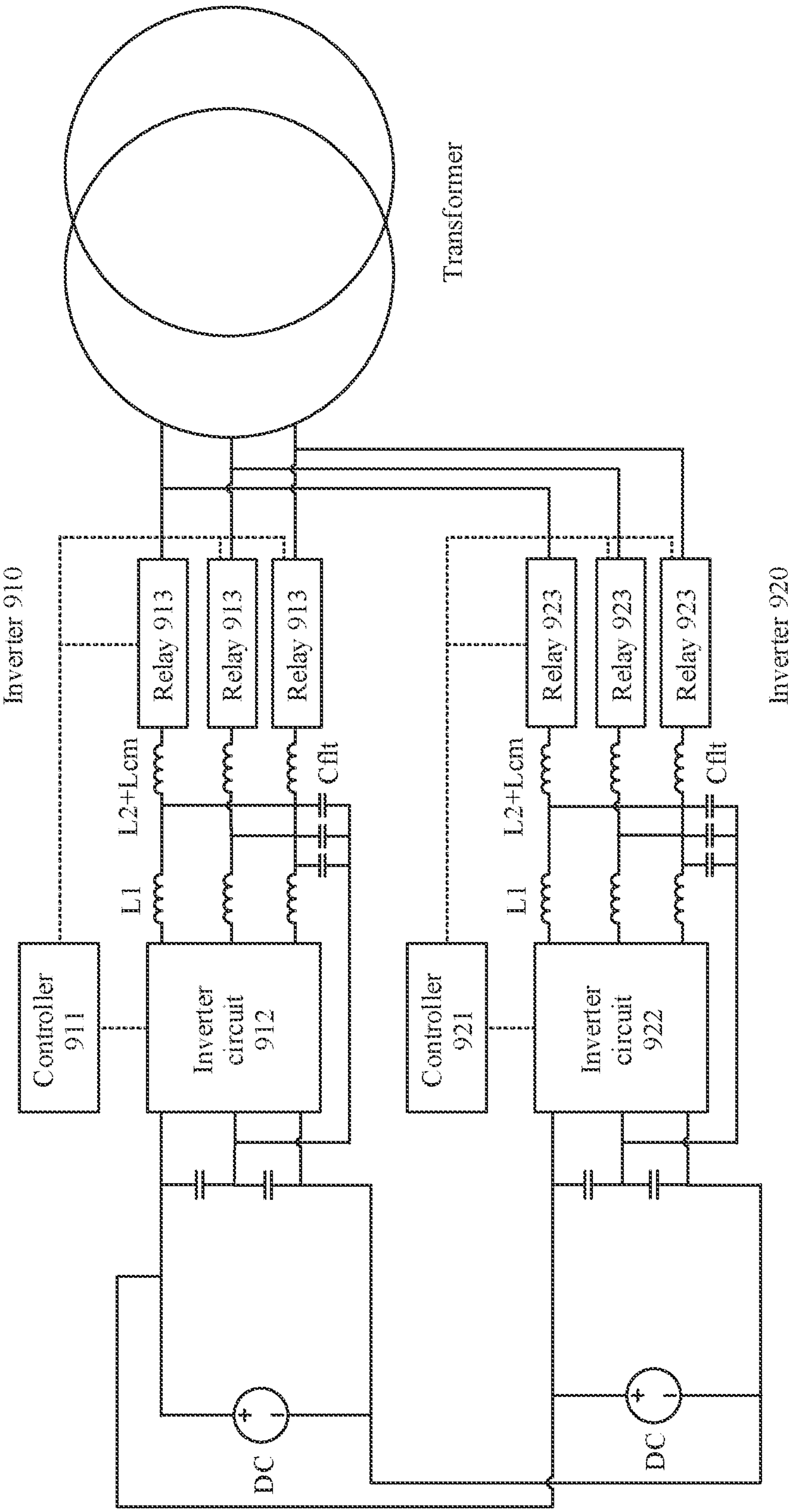
FIG. 9 is a schematic diagram of a multi-inverter parallel system with a common direct current bus according to an embodiment of this application.

FIG. 9 shows an example of another multi-inverter parallel system according to an embodiment of this application. The example is specifically a multi-inverter parallel system with a common direct current bus. The multi-inverter parallel system with a common direct current bus includes a plurality of inverters. Positive electrodes of input ends of inverter circuits of the plurality of inverters are connected to each other, negative electrodes of the input ends are connected to each other, and phases of output ends of the inverter circuits of the plurality of inverters are connected to a same transformer. The transformer is further connected to a three-phase alternating current grid. A quantity of inverters included in the multi-inverter parallel system with a common direct current bus is not specifically limited in this application. For ease of illustration, FIG. 9 shows only two inverters. Each inverter is a three-phase inverter, and may include a controller, an inverter circuit, a relay, and related circuit elements such as a capacitor and an inductor. As shown in FIG. 9, the inverter 910 includes a controller 911, an inverter circuit 912, and three relays 913, and the inverter 920 includes a controller 921, an inverter circuit 922, and three relays 923. In practice, a quantity of inverters in the system may be expanded based on the foregoing connection manner as required, and details are not described again.

A grid connection mechanism of an inverter applicable to the multi-inverter parallel system with a common direct current bus in FIG. 9 may include:

Initially, no inverter in the system is grid-connected, and an inverter (for example, an inverter 910) may be designated to be first grid-connected. Before the inverter 910 is grid-connected, there is no grid-connected inverter in the system. Therefore, when three relays 913 of the inverter 910 are turned on, it only needs to be ensured that a bus voltage of the inverter 910 is not lower than a minimum bus voltage required for grid connection, and any common-mode voltage injection manner may be used. Before the three relays 913 are turned on, the inverter 910 controls a differential-mode line voltage output by the inverter 910 to be consistent with a line voltage of the grid. Then, the inverter 910 controls the three relays 913 to be turned on, to implement grid-connected operation of the inverter 910.

After the inverter 910 is grid-connected, when an inverter subsequently needs to be grid-connected, for example, when an inverter 920 needs to be grid-connected, the inverter 920 may control, by communicating with the inverter 910, the to-be-grid-connected inverter 920 in a same common-mode voltage injection manner as the grid-connected inverter 910. Because the inverter 910 and the inverter 920 are connected in parallel by using a common direct current bus, direct current bus voltages of the two inverters are naturally consistent, and there is no need to control through communication, that the direct current bus voltages of the two inverters are consistent. Before the three relays 923 are turned on, the to-be-grid-connected inverter 920 may further control a differential-mode line voltage output by the inverter 920 to be consistent with a grid line voltage, and control, in a common-mode voltage injection manner the same as the common-mode voltage injection manner of the inverter 910, the common-mode voltage output by the inverter 920. Then, the inverter 920 controls the three relays 923 to be turned on, to implement grid-connected operation of the inverter 920.

Further, if the system further includes more inverters, grid-connected operation of another inverter can be implemented in the foregoing manner, and details are not described herein again.

Figure 10:
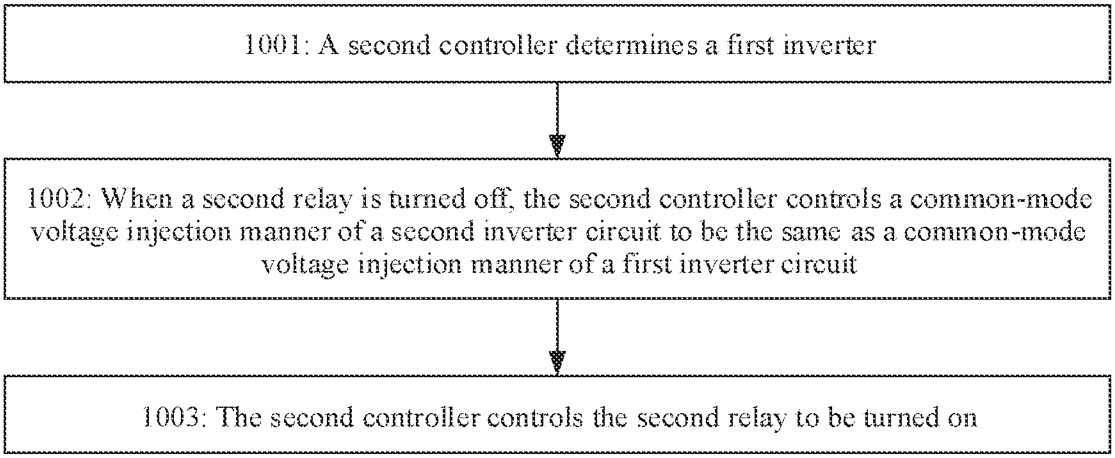
FIG. 10 is still another schematic flowchart of a method for controlling grid connection of an inverter according to an embodiment of this application.

From a perspective of the second inverter, another method for controlling grid connection of an inverter corresponding to a multi-inverter parallel system provided in this embodiment of this application may be shown in FIG. 10. The method is applied to a second controller of a second inverter in the multi-inverter parallel system, and the second inverter is an inverter that is to be grid-connected and that is in the multi-inverter parallel system. The method includes the following steps.

Step 1001: The second controller determines a first inverter, where the first inverter is an inverter that is grid-connected and that is in the multi-inverter parallel system.

In this embodiment of this application, the second controller may select, based on a specific preset rule, an inverter that is grid-connected and that is in the multi-inverter parallel system as the first inverter. For example, the second controller may select an inverter that is first grid-connected and that is in the multi-inverter parallel system as the first inverter, or may select an inverter that is recently grid-connected and that is in the multi-inverter parallel system as the first inverter, or may select any inverter that has been grid-connected in the multi-inverter parallel system as the first inverter. This is not limited in this application.

Step 1002: When the second relay is turned off, the second controller controls a common-mode voltage injection manner of the second inverter circuit to be the same as a common-mode voltage injection manner of the first inverter circuit.

Optionally, when the second relay is turned off, the second controller may alternatively control an effective value of a differential-mode line voltage output by the second inverter circuit to be the same as an effective value of a grid line voltage.

Step 1003: The second controller controls the second relay to be turned on.

A person skilled in the art should understand that embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct a computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

The computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a specific function in one or more procedures in the flowcharts and/or in one or more blocks in the block diagrams.

It is clear that a person skilled in the art can make various modifications and variations to this application without departing from the scope of this application. This application is intended to cover these modifications and variations of this application provided that they fall within the scope of protection defined by the following claims of this application and their equivalent technologies.

What is claimed is:

1. A multi-inverter parallel system, wherein the multi-inverter parallel system comprises a first inverter and a second inverter;

the first inverter comprises a first controller, a first inverter circuit, and a first relay, wherein an input end of the first inverter circuit is configured to connect to a first direct current bus, and an output end of the first inverter circuit is configured to connect to the first relay;

the second inverter comprises a second controller, a second inverter circuit, and a second relay, wherein an input end of the second inverter circuit is configured to connect to a second direct current bus, an output end of the second inverter circuit is configured to connect to the second relay, and phases of the output end of the first inverter circuit are correspondingly connected to phases of the output end of the second inverter circuit;

the first controller is configured to control the first relay to be turned on; and the second controller is configured to:

when the second relay is turned off, control a direct current bus voltage of the second inverter circuit to be the same as a direct current bus voltage of the first inverter circuit existing when the first relay is turned on, and control a common-mode voltage injection manner of the second inverter circuit to be the same as a common-mode voltage injection manner of the first inverter circuit existing when the first relay is turned on; and control the second relay to be turned on.

2. The system according to claim 1, wherein the first controller is configured to: when the first relay is turned on, control a difference between the direct current bus voltage of the first inverter circuit and a first voltage value to be less than a first voltage threshold; and the second controller is configured to: when the second relay is turned off, control a difference between the direct current bus voltage of the second inverter circuit and the first voltage value to be less than the first voltage threshold.

3. The system according to claim 2, wherein the first controller is further configured to:

receive a first bus voltage instruction from the second controller, wherein the first bus voltage instruction indicates an initial direct current bus voltage of the second inverter circuit;

determine the first voltage value based on an initial direct current bus voltage of the first inverter circuit and the initial direct current bus voltage of the second inverter circuit; and send a second bus voltage instruction to the second controller, wherein the second bus voltage instruction indicates the first voltage value.

4. The system according to claim 2, wherein the second controller is further configured to:

receive a third bus voltage instruction from the first controller, wherein the third bus voltage instruction indicates an initial direct current bus voltage of the first inverter circuit;

determine the first voltage value based on the initial direct current bus voltage of the first inverter circuit and an initial direct current bus voltage of the second inverter circuit; and send a fourth bus voltage instruction to the first controller, wherein the fourth bus voltage instruction indicates the first voltage value.

5. The system according to claim 1, wherein the second controller is further configured to:

receive common-mode voltage injection manner information from the first controller, wherein the common-mode voltage injection manner information indicates a first common-mode voltage injection manner used by the first inverter circuit; and control, based on the first common-mode voltage injection manner, a common-mode voltage output by the second inverter circuit.

6. The system according to claim 1, wherein the second controller is further configured to:

when the second relay is turned off, control an effective value of a differential-mode line voltage output by the second inverter circuit to be the same as an effective value of a grid line voltage.

7. The system according to claim 1, wherein the first direct current bus comprises a first positive direct current bus and a first negative direct current bus, the first positive direct current bus is configured to connect to a positive electrode of the input end of the first inverter circuit, and the first negative direct current bus is configured to connect to a negative electrode of the input end of the first inverter circuit;

the second direct current bus comprises a second positive direct current bus and a second negative direct current bus, the second positive direct current bus is configured to connect to a positive electrode of the input end of the second inverter circuit, and the second negative direct current bus is configured to connect to a negative electrode of the input end of the second inverter circuit; and the first negative direct current bus is connected to the second positive direct current bus, or the first positive direct current bus is connected to the second negative direct current bus.

8. A method for controlling grid connection of an inverter, wherein the method is applied to a second controller of a second inverter, the second inverter is an inverter that is to be grid-connected and that is in a multi-inverter parallel system, the second inverter comprises the second controller, a second inverter circuit, and a second relay, an input end of the second inverter circuit is connected to a second direct current bus, and an output end of the second inverter circuit is connected to the second relay; and the method comprises:

determining, by the second controller, a first inverter, wherein the first inverter is an inverter that is grid-connected and that is in the multi-inverter parallel system, the first inverter comprises a first controller, a first inverter circuit, and a first relay, an input end of the first inverter circuit is connected to a first direct current bus, an output end of the first inverter circuit is connected to the first relay, the first relay is turned on, and phases of the output end of the first inverter circuit are correspondingly connected to phases of the output end of the second inverter circuit;

when the second relay is turned off, controlling, by the second controller, a direct current bus voltage of the second inverter circuit to be the same as a direct current bus voltage of the first inverter circuit, and controlling a common-mode voltage injection manner of the second inverter circuit to be the same as a common-mode voltage injection manner of the first inverter circuit; and controlling, by the second controller, the second relay to be turned on.

9. The method according to claim 8, wherein the controlling, by the second controller when the second relay is turned off, a direct current bus voltage of the second inverter circuit to be the same as a direct current bus voltage of the first inverter circuit comprises:

controlling, by the second controller when the second relay is turned off, a difference between the direct current bus voltage of the second inverter circuit and a first voltage value to be less than a first voltage threshold.

10. The method according to claim 9, wherein the method further comprises:

determining, by the second controller, the first voltage value based on an initial direct current bus voltage of the first inverter circuit and an initial direct current bus voltage of the second inverter circuit; or receiving, by the second controller, a second bus voltage instruction from the first controller, wherein the second bus voltage instruction indicates the first voltage value.

11. The method according to claim 8, wherein the controlling, by the second controller when the second relay is turned off, a common-mode voltage injection manner of the second inverter circuit to be the same as a common-mode voltage injection manner of the first inverter circuit comprises:

receiving, by the second controller, common-mode voltage injection manner information from the first controller, wherein the common-mode voltage injection manner information indicates a first common-mode voltage injection manner used by the first inverter circuit; and controlling, by the second controller based on the first common-mode voltage injection manner, a common-mode voltage output by the second inverter circuit.

12. The method according to claim 8, wherein the method further comprises:

when the second relay is turned off, controlling, by the second controller, an effective value of a differential-mode line voltage output by the second inverter circuit to be the same as an effective value of a grid line voltage.

13. The method according to claim 8, wherein the second direct current bus comprises a second positive direct current bus and a second negative direct current bus, the second positive direct current bus is connected to a positive electrode of the input end of the second inverter circuit, and the second negative direct current bus is connected to a negative electrode of the input end of the second inverter circuit;

the first direct current bus comprises a first positive direct current bus and a first negative direct current bus, the first positive direct current bus is connected to a positive electrode of the input end of the first inverter circuit, and the first negative direct current bus is connected to a negative electrode of the input end of the first inverter circuit; and the first negative direct current bus is connected to the second positive direct current bus, or the first positive direct current bus is connected to the second negative direct current bus.

* * * * *